(12) United States Patent
Zhang

(10) Patent No.: US 10,899,054 B2
(45) Date of Patent: Jan. 26, 2021

(54) INJECTION MOLD

(71) Applicant: Nanching O-film Precision Optical Product Co., Ltd., Nanchang (CN)

(72) Inventor: Gangqiang Zhang, Nanchang (CN)

(73) Assignee: Nanchang O-film Precision Optical Product Co., Ltd., Nanchang (CN)

( * ) Notice: Subject to any disclaimer, the term of this patent is extended or adjusted under 35 U.S.C. 154(b) by 399 days.

(21) Appl. No.: 15/858,684

(22) Filed: Dec. 29, 2017

(65) Prior Publication Data

US 2019/0099930 A1    Apr. 4, 2019

(30) Foreign Application Priority Data

Sep. 29, 2017 (CN) .......................... 2017 1 0911193
Sep. 29, 2017 (CN) ..................... 2017 2 1273470 U

(51) Int. Cl.
*B29C 45/27* (2006.01)
*B29C 45/40* (2006.01)
*B29C 33/38* (2006.01)

(52) U.S. Cl.
CPC ........ *B29C 45/2701* (2013.01); *B29C 45/401* (2013.01); *B29C 33/38* (2013.01); *B29C 45/40* (2013.01); *B29C 2045/2719* (2013.01); *B29K 2995/007* (2013.01)

(58) Field of Classification Search
CPC ... B29C 45/2701; B29C 45/401; B29C 45/40; B29C 33/38; B29C 2045/2719; B29C 45/26; B29K 2995/007; B29L 31/32
See application file for complete search history.

(56) References Cited

U.S. PATENT DOCUMENTS

2017/0232650 A1*  8/2017  Zhou ...................... B29C 45/03
                                                                  425/552

* cited by examiner

*Primary Examiner* — Robert J Grun
(74) *Attorney, Agent, or Firm* — Osha Bergman Watanabe & Burton LLP

(57) ABSTRACT

An injection mold includes an upper mold core, an upper mold plate, a sprue bushing and an upper mold fixing plate. The sprue bushing is completely accommodated in the upper mold plate and the upper mold core, the sprue bushing defining a runner therein. The sprue bushing includes a mounting part and an extending part extending from the mounting part, the mounting part is received in the upper mold plate, the extending part is disposed through the upper mold core, and the runner runs through the mounting part and the extending part. The upper mold fixing plate is piled on and fixed to the upper mold plate, the upper mold fixing plate is provided with a through hole communicated with the runner, the upper mold fixing plate includes a flange extending inwardly from a side wall of the through hole, the flange abuts against the mounting part.

9 Claims, 3 Drawing Sheets

INJECTION MOLD

FIELD

The present disclosure relates to a technical field of molds, and more particularly to an injection mold.

BACKGROUND

In a traditional injection mold, when an injection process is completed, there are a lot of waste materials accumulated in a sprue bushing, which is easy to cause a waste of plastic raw material. In addition, it is difficult to mount a sprue bushing in the injection mold.

SUMMARY

Embodiments of the present disclosure seek to solve at least one of the problems existing in the related art to at least some extent. For that reason, an injection mold is provided by the present disclosure. The injection mold includes: an upper mold core; an upper mold plate; a sprue bushing completely accommodated in the upper mold plate and the upper mold core, the sprue bushing defining a runner therein, in which the sprue bushing includes a mounting part and an extending part extending from the mounting part, a cross section of the mounting part is larger than that of the extending part, the mounting part is received in the upper mold plate, the extending part is disposed through the upper mold core, and the runner runs through the mounting part and the extending part; and an upper mold fixing plate, in which the upper mold fixing plate is piled on and fixed to the upper mold plate, the upper mold fixing plate is provided with a through hole communicated with the runner, the upper mold fixing plate includes a flange extending inwardly from a side wall of the through hole, the flange abuts against the mounting part, the injection mold includes a fastener, and the fastener is disposed through the flange and is fixedly connected with the mounting part.

In the injection mold according to embodiments of the present disclosure, since the sprue bushing is completely accommodated in the upper mold plate and the upper mold core, the sprue bushing has a small dimension and the runner has a short length. Thus, the injection mold can reduce waste materials which are accumulated in the sprue bushing when the molding process is accomplished, thereby saving plastic raw materials. In addition, as the length of the runner is short, the time that the plastic remains in the runner is shortened during the injection molding, which is beneficial for the molding of the product and can improve the production efficiency. Moreover, the fastener is disposed through the flange and is fixedly connected with the mounting part, such that it is beneficial for the mounting part to fix the sprue bushing to the injection mold, thereby reducing production cost of the injection mold and improving impact resistance of the injection mold.

In some embodiments, the upper mold plate defines an accommodating cavity, and the upper mold core is received in the accommodating cavity. Thus, a total thickness of the upper mold core and the upper mold plate is reduced, such that the injection mold can be miniaturized.

In some embodiments, a gap is provided between the upper mold plate and a side edge of the sprue bushing, such that the impact resistance of the injection mold can be improved, probability of deformation of the injection mold can be reduced, and the service life of the injection mold can be improved.

In some embodiments, the upper mold core includes a bottom surface, the bottom surface is provided with a mold cavity, and the mold cavity is communicated with the runner. Thus, the plastic raw material can flow into the mold cavity through the runner, thereby allowing the plastic raw material to be cooled and formed in the mold cavity.

In some embodiments, the injection mold includes an ejector pin, in which the ejector pin extends into the mold cavity and can move in a vertical direction with respect to the mold cavity. Thus, when the plastic raw material is solidified and formed in the mold cavity, the upper mold plate and the upper mold core can be opened by means of opening the mold, and a plastic member can be ejected by the ejector pin, and then a plastic product can be obtained after the waste plastic is removed from the plastic member.

In some embodiments, hardness of the upper mold core is higher than that of the upper mold plate. Thus, it is possible to prevent the upper mold core from deformation and improve the service life of the injection mold.

In some embodiments, the runner includes a feeding inlet, the sprue bushing is provided with a feeding cavity at a periphery of the feeding inlet, and the feeding inlet is funnel-shaped. Thus, the feeding inlet is funnel-shaped, so as to facilitate the plastic raw material injection into the runner.

In some embodiments, the fastener is a screw, the screw includes a screw head and a screw rod, the screw head abuts against the flange, and the screw rod is screwed into the mounting part. As the screw can fix the sprue bushing to both the upper mold fixing plate and the upper mold plate at the same time, the impact resistance of the sprue bushing can be improved. Moreover, the screw can make the upper mold fixing plate fix the upper mold plate, such that the production process of the injection mold can be simplified and the production cost of the injection mold can be reduced.

In some embodiments, the through hole includes a first part far away from the sprue bushing and a second part adjacent to the sprue bushing, the second part being connected with the first part, and a cross section of the first part being larger than that of the second part. Thus, the plastic raw material is convenient to be injected into the runner.

In some embodiments, the injection mold includes a locating ring provided to the upper mold fixing plate, the locating ring being provided with a deflector hole communicated with the through hole. Thus, the deflector hole makes it convenient to inject the plastic raw material into the runner. The locating ring is fixed to the upper mold fixing plate, for example through a screw.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
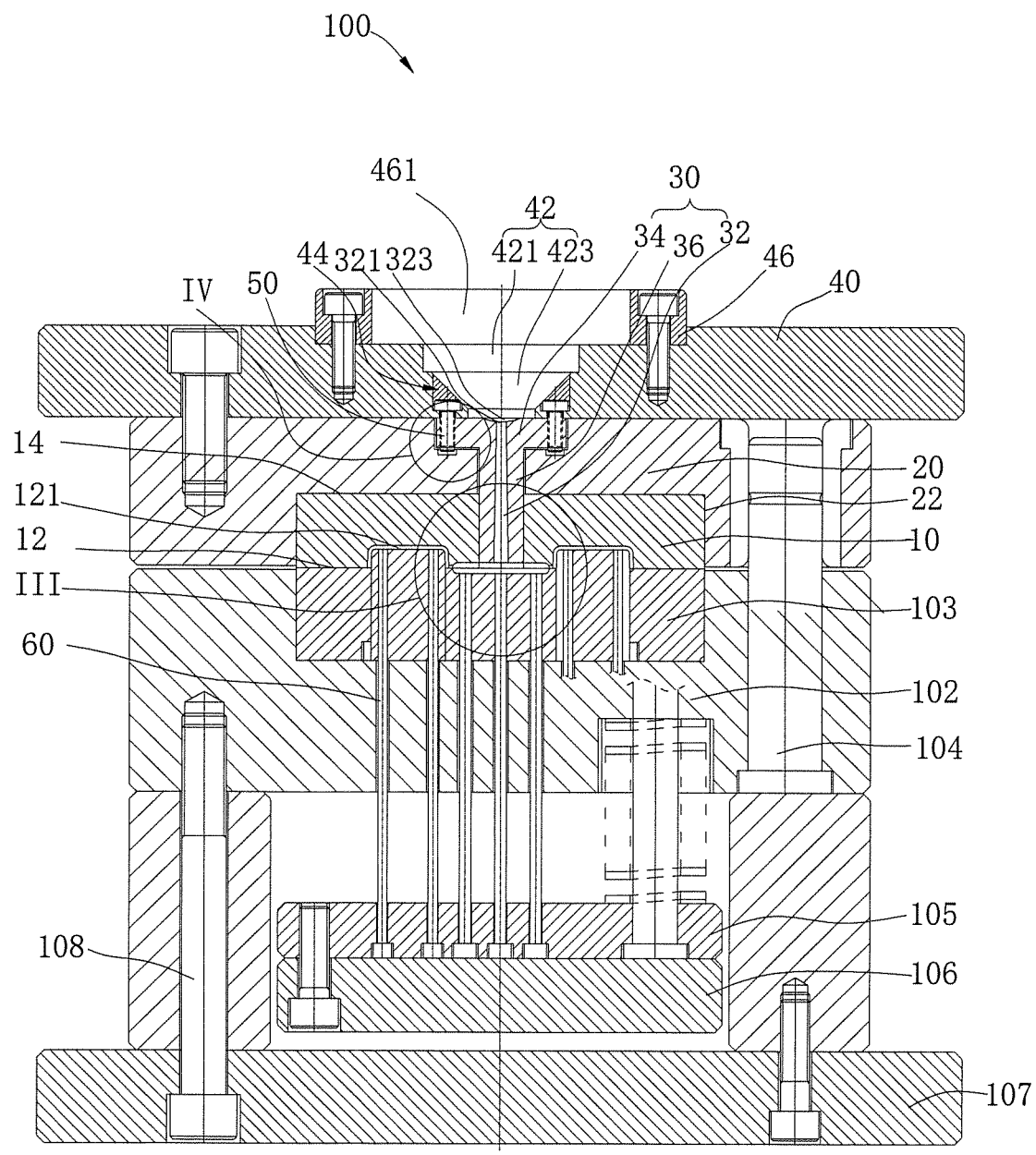
FIG. 1 is a schematic view illustrating a cross section of an injection mold according to embodiments of the present disclosure.

Injection mold 100, upper mold core 10, bottom surface 12, top surface 14, mold cavity 121, upper mold plate 20, accommodating cavity 22, sprue bushing 30, runner 32, feeding inlet 321, feeding cavity 323, mounting part 34, extending part 36, upper mold fixing plate 40, through hole 42, first part 421, second part 423, flange 44, locating ring 46, deflector hole 461, fastener 50, ejector pin 60, gap 70, lower mold plate 102, lower mold core 103, guide pillar 104, upper ejector retainer plate 105, lower ejector retainer plate 106, lower mold fixing plate 107, long guide pillar 108.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

In the related art, an injection mold includes an upper mold core and an upper mold plate, and a sprue bushing is mounted to an exterior of the upper mold plate and extends into the upper mold plate and the upper mold core. This allows the sprue bushing to have a relatively long runner, such that a lot of plastic raw materials will be accumulated in the runner, and during an injection molding, the time that the plastic remains in the runner is increased, which is not beneficial for molding of a product and may reduce production efficiency.

Figure 2:
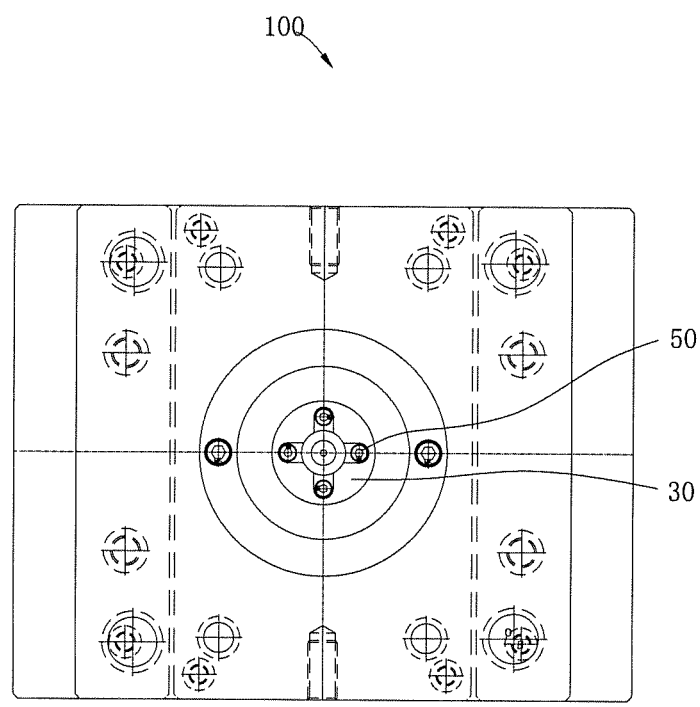
FIG. 2 is another schematic view illustrating a cross section of an injection mold according to embodiments of the present disclosure.
Figure 3:
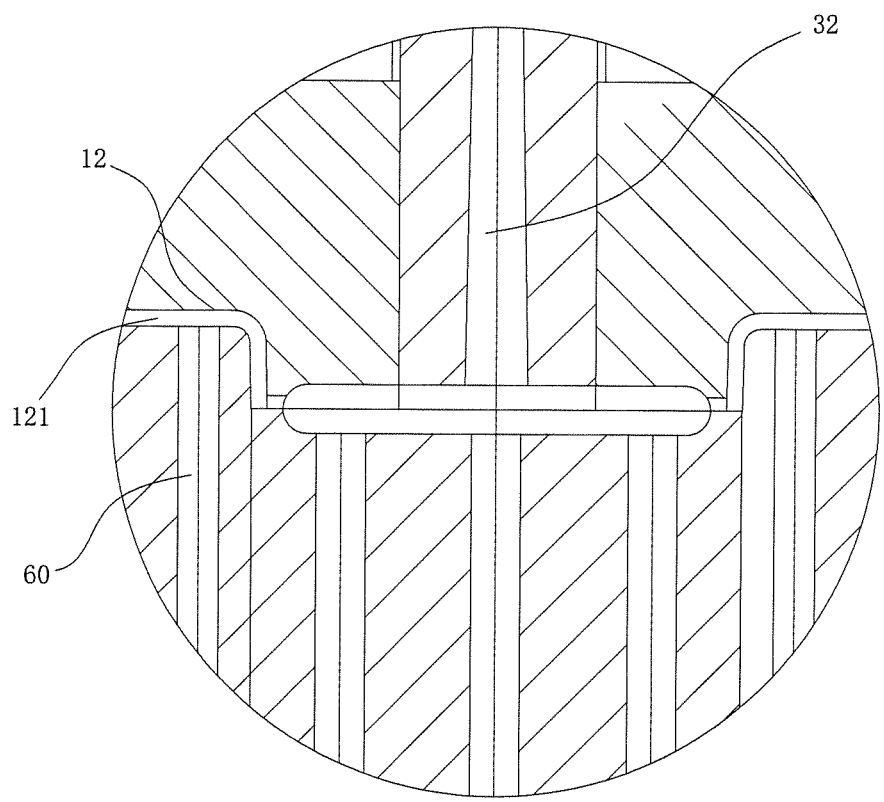
FIG. 3 is an enlarged view of a part, circled by III, of the injection mold of FIG. 1.

Referring to FIGS. 1-3, an injection mold 100 is provided by embodiments of the present disclosure. The injection mold 100 includes an upper mold core 10, an upper mold plate 20, a sprue bushing 30 and an upper mold fixing plate 40. The sprue bushing 30 is completely accommodated in the upper mold plate 20 and the upper mold core 10. The sprue bushing 30 defines a runner 32 therein. The sprue bushing 30 includes a mounting part 34 and an extending part 36 extending from the mounting part 34. A cross section of the mounting part 34 is larger than that of the extending part 36. The mounting part 34 is received in the upper mold plate 20. The extending part 36 is disposed through the upper mold core 10. The runner 32 runs through the mounting part 34 and the extending part 36. The upper mold fixing plate 40 is piled on and fixed to the upper mold plate 20. The upper mold fixing plate 40 is provided with a through hole 42 communicated with the runner 32. The upper mold fixing plate 40 includes a flange 44 extending inwardly from a side wall of the through hole 42. The flange 44 abuts against the mounting part 34. The injection mold 100 includes a fastener 50. The fastener 50 is disposed through the flange 44 and is fixedly connected with the mounting part 34.

In the injection mold 100 according to embodiments of the present disclosure, since the sprue bushing 30 is completely accommodated in the upper mold plate 20 and the upper mold core 10, the sprue bushing 30 has a small dimension and the runner 32 has a short length. Thus, the injection mold 100 can reduce waste materials which are accumulated in the sprue bushing 30 when the molding process is accomplished, thereby saving plastic raw materials. In addition, as the length of the runner 32 is short, the time that the plastic remains in the runner 32 is shortened during the injection molding, which is beneficial for the molding of the product and can improve the production efficiency. Moreover, the fastener 50 is disposed through the flange 44 and is fixedly connected with the mounting part 34, such that it is beneficial for the mounting part 34 to fix the sprue bushing 30 to the injection mold 100, thereby reducing production cost of the injection mold 100 and improving impact resistance of the injection mold 100.

It could be understood that, the sprue bushing 30 is used to inject the molten plastic raw materials into the injection mold 100.

It could be understood that, the fastener 50 can fix the sprue bushing 30 to both the upper mold fixing plate 40 and the upper mold plate 20 at the same time. Thus, during the injection molding, the sprue bushing 30 can be prevented from deformation, a service life of the sprue bushing 30 can be improved and the production cost of the injection mold 100 can be reduced.

In the present embodiment, one sprue bushing 30 is provided to the injection mold 100. Certainly, in other embodiments, the injection mold 100 includes two or more than two sprue bushings 30.

In some embodiments, the upper mold plate 20 defines an accommodating cavity 22, and the upper mold core 10 is received in the accommodating cavity 22. Thus, a total thickness of the upper mold core 10 and the upper mold plate 20 is reduced, such that the injection mold 100 can be miniaturized. It could be understood that, as the upper mold 10 is received in the accommodating cavity 22, the total thickness of the upper mold core 10 and the upper mold plate 20 is equivalent to the thickness of the upper mold plate 20.

Specifically, the upper mold plate 20 is closely fitted with the upper mold core 10, for example, the upper mold plate 20 adheres to the upper mold core 10 through an adhesive. As the upper mold core 10 is in direct contact with the molten plastic, the impact on the upper mold core 10 is larger than the impact on the upper mold plate 20, thus when choosing the materials for production, it is necessary to ensure the material for production of the upper mold core 10 has larger impact resistance than the material for production of the upper mold plate 20.

Figure 4:
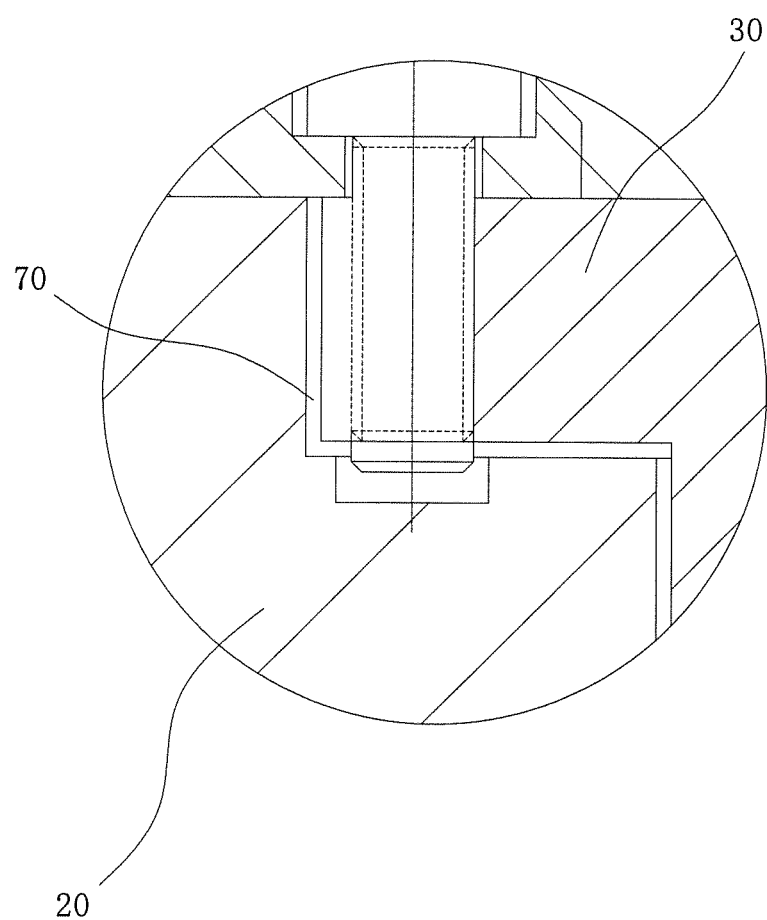
FIG. 4 is an enlarged view of a part, circled by IV, of the injection mold of FIG. 1.

Referring to FIG. 4, in some embodiments, a gap 70 is provided between the upper mold plate 20 and a side edge of the sprue bushing 30, such that the impact resistance of the injection mold 100 can be improved, probability of deformation of the injection mold 100 can be reduced, and the service life of the injection mold 100 can be improved.

Referring to FIG. 3, in some embodiments, the upper mold core 10 includes a bottom surface 12. The bottom surface 12 is provided with a mold cavity 121. The mold cavity 121 is communicated with the runner 32. Thus, the plastic raw material can flow into the mold cavity 121 through the runner 32, thereby allowing the plastic raw material to be cooled and formed in the mold cavity 121.

It should be noted that, two or more than two mold cavities can be provided. A shape of the mold cavity can be adjusted according to requirements for the product.

Specifically, the upper mold core 10 includes a top surface 14, and the top surface 14 is closely fitted with the upper mold plate 20.

In some embodiments, the injection mold 100 includes an ejector pin 60, the ejector pin 60 extends into the mold cavity 121 and can move in a vertical direction with respect to the mold cavity 121. Thus, when the plastic raw material is solidified and formed in the mold cavity 121, the upper mold plate 20 and the upper mold core 10 can be opened by means of opening the mold, and a plastic member can be ejected by the ejector pin 60, and then a plastic product can be obtained after the waste plastic is removed from the plastic member.

It could be understood that, the ejector pin 60 can be an exhaust ejector pin or a balance ejector pin.

In some embodiments, hardness of the upper mold core 10 is higher than that of the upper mold plate 20.

Thus, it is possible to prevent the upper mold core 10 from deformation and improve the service life of the injection mold 100.

Specifically, the upper core 10 can adopt a relatively hard steel material, for example 12Cr13 (martensitic heat-resistant steel). As the bottom surface 12 of the upper mold core 10 is provided with the mold cavity 121, the impact of the molten plastic on the upper mold core 10 is larger than that on the upper mold plate 20. The upper mold core 10 with the high hardness is beneficial to improving the impact resistance of the injection mold 100, thereby preventing the injection mold 100 from deformation, and improving the service life of the injection mold 100. It could be understood that, the upper mold core 10 has characteristics of high temperature resistance and corrosion resistance.

In some embodiments, the runner 32 includes a feeding inlet 321. The sprue bushing 30 is provided with a feeding cavity 323 at a periphery of the feeding inlet 321. The feeding inlet 323 is funnel-shaped. In other words, a lateral dimension of the feeding cavity 323 gradually reduces from an end far away from the runner 32 to the other end adjacent to the runner 32. Thus, the feeding inlet 323 is funnel-shaped, so as to make it convenient to inject the plastic raw material into the runner 32.

In some embodiments, the fastener 50 is a screw. The screw includes a screw head and a screw rod. The screw head abuts against the flange 44. The screw rod is screwed into the mounting part 34. As the screw can fix the sprue bushing 30 to both the upper mold fixing plate 40 and the upper mold plate 20 at the same time, the impact resistance of the sprue bushing 30 can be improved. Moreover, the screw can make the upper mold fixing plate 40 fix the upper mold plate 20, such that the production process of the injection mold 100 can be simplified and the production cost of the injection mold 100 can be reduced.

It could be understood that, the screw rod is provided with a thread, and the mounting part 34 is provided with a threaded hole fitted with the screw rod, such that the screw rod can be fixedly connected with the mounting part 34.

In some embodiments, the through hole 42 includes a first part 421 far away from the sprue bushing 30 and a second part 423 adjacent to the sprue bushing 30. The second part 423 is connected with the first part 421. A cross section of the first part 421 is larger than that of the second part 423. Thus, the plastic raw material is convenient to be injected into the runner 32.

Specifically, the second part 423 is approximately funnel-shaped. The diameter of the second part 423 gradually reduces from an end far away from the runner 32 to the other end adjacent to the runner 32.

In some embodiments, the injection mold 100 includes a locating ring 46 provided to the upper mold fixing plate 40. The locating ring 46 is provided with a deflector hole 461 communicated with the through hole 42. Thus, the deflector hole 461 makes it convenient to inject the plastic raw material into the runner 32. The locating ring 46 is fixed to the upper mold fixing plate 40, for example through a screw.

Specifically, the deflector hole 461 is approximately funnel-shaped. The diameter of the deflector hole 461 gradually reduces from an end far away from the runner 32 to the other end adjacent to the runner 32.

Specifically, an inner diameter of the locating ring 46 is consistent with the diameter of the through hole 42. The locating ring 46 ensures that the sprue bushing 30 of the injection mold 100 completely coincides with a nozzle of an injection molding machine (not shown) at a horizontal position.

In some embodiments, the injection mold 100 includes a lower mold plate 102 and a lower mold core 103. The lower mold plate 102 and the lower mold core 103 are respectively fitted and connected with the upper mold plate 20 and the upper mold core 10. Connecting surfaces of the upper mold plate 20 and the lower mold plate 102, and connecting surfaces of the upper mold core 10 and the lower mold core 103 each are parting surfaces.

In some embodiments, the injection mold 100 includes at least two guide pillars 104 (only one guide pillar is shown in the drawings). The guide pillar 104 is disposed through the lower mold plate 102 and the upper mold plate 20, and the at least two guide pillars 104 can accurately position the lower mold plate 102 and the upper mold plate 20. Thus, the guide pillar 104 is a guide component to guide the injection mold 100 to be positioned.

In some embodiments, the injection mold 100 includes an upper ejector retainer plate 105 and a lower ejector retainer plate 106. The upper ejector retainer plate 105 and the lower ejector retainer plate 106 fix the ejector pin 60, and when the upper ejector retainer plate 105 and the lower ejector retainer plate 106 move, the ejector pin 60 can be driven to move.

In some embodiments, the injection mold 100 includes a lower mold fixing plate 107. The lower mold fixing plate 107 is used to bear the injection mold 100.

In some embodiments, the injection mold 100 includes a long guide pillar 108. The long guide pillar 108 positions the lower mold fixing plate 107.

The injection molding process to form a product by the injection mold 100 is as follows. The plastic raw material enters the feeding cavity 323 via the through hole 42, passes through the runner 32 and reaches the mold cavity 121 finally. The plastic raw material is solidified and formed in the mold cavity 121 to obtain a required product blank. The upper mold plate 20 and the upper mold core 10 are removed to allow exposure of the product blank, and a qualified product can be obtained when burrs of the product blank are removed.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An injection mold, comprising:
an upper mold core;
an upper mold plate;
a sprue bushing completely accommodated in the upper mold plate and the upper mold core, the sprue bushing defining a runner therein, wherein the sprue bushing comprises a mounting part and an extending part extending from the mounting part, a cross section of the mounting part is larger than that of the extending part, the mounting part is received in the upper mold plate, the extending part is disposed through the upper mold core, the runner runs through the mounting part and the extending part, and a gap is provided between the upper mold plate and a side edge of the sprue bushing; and
an upper mold fixing plate, wherein the upper mold fixing plate is piled on and fixed to the upper mold plate, the upper mold fixing plate is provided with a through hole communicated with the runner, the upper mold fixing plate includes a flange extending inwardly from a side wall of the through hole, the flange abuts against the mounting part, the injection mold includes a fastener, and the fastener is disposed through the flange and is fixedly connected with the mounting part and fixes the sprue bushing to both the upper mold fixing plate and the upper mold plate.

2. The injection mold according to claim 1, wherein the upper mold plate defines an accommodating cavity, and the upper mold core is received in the accommodating cavity.

3. The injection mold according to claim 1, wherein the upper mold core comprises a bottom surface, the bottom surface is provided with a mold cavity, and the mold cavity is communicated with the runner.

4. The injection mold according to claim 3, comprising an ejector pin, wherein the ejector pin extends into the mold cavity and can move in a vertical direction with respect to the mold cavity.

5. The injection mold according to claim 1, wherein hardness of the upper mold core is higher than that of the upper mold plate.

6. The injection mold according to claim 1, wherein the runner comprises a feeding inlet, the sprue bushing is provided with a feeding cavity at a periphery of the feeding inlet, and the feeding cavity is funnel-shaped.

7. The injection mold according to claim 1, wherein the fastener is a screw, the screw comprises a screw head and a screw rod, the screw head abuts against the flange, and the screw rod is screwed into the mounting part.

8. The injection mold according to claim 1, wherein the through hole comprises a first part far away from the sprue bushing and a second part adjacent to the sprue bushing, the second part being connected with the first part, and a cross section of the first part being larger than that of the second part.

9. The injection mold according to claim 1, wherein the injection mold comprises a locating ring provided to the upper mold fixing plate, the locating ring being provided with a deflector hole communicated with the through hole.

* * * * *